(12) United States Patent
Zhang et al.

(10) Patent No.: US 10,613,033 B2
(45) Date of Patent: Apr. 7, 2020

(54) POROUS SILICON SENSOR

(71) Applicant: ROCKLEY PHOTONICS LIMITED, London (GB)

(72) Inventors: Yi Zhang, Pasadena, CA (US); Aaron John Zilkie, Pasadena, CA (US); Haydn Frederick Jones, Reading (GB); Adam Scofield, Los Angeles, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 16/351,331

(22) Filed: Mar. 12, 2019

(65) Prior Publication Data

US 2019/0285552 A1  Sep. 19, 2019

Related U.S. Application Data

(60) Provisional application No. 62/642,435, filed on Mar. 13, 2018.

(51) Int. Cl.
| | | |
|---|---|---|
| *G01N 21/77* | (2006.01) | |
| *G02B 6/122* | (2006.01) | |
| *G02B 6/136* | (2006.01) | |
| *G02B 6/12* | (2006.01) | |

(52) U.S. Cl.
CPC ....... *G01N 21/7703* (2013.01); *G02B 6/1225* (2013.01); *G02B 6/136* (2013.01); *G01N 21/774* (2013.01); *G01N 21/7746* (2013.01); *G01N 2021/7726* (2013.01); *G01N 2021/7776* (2013.01); *G01N 2021/7779* (2013.01); *G01N 2021/7783* (2013.01); *G01N 2021/7789* (2013.01); *G02B 6/12004* (2013.01); *G02B 2006/1213* (2013.01); *G02B 2006/12061* (2013.01); *G02B 2006/12138* (2013.01); *G02B 2006/12176* (2013.01)

(58) Field of Classification Search
None
See application file for complete search history.

(56) References Cited

U.S. PATENT DOCUMENTS

| | | | |
|---|---|---|---|
| 5,250,095 A * | 10/1993 | Sigel, Jr. | ............... C03C 13/005 385/12 |
| 6,130,748 A | 10/2000 | Krüger et al. | |
| 6,375,725 B1 * | 4/2002 | Bernard | ............ G01N 21/7703 55/DIG. 34 |

(Continued)

FOREIGN PATENT DOCUMENTS

FR   2 856 150 A1   12/2017

OTHER PUBLICATIONS

Kyowon Kim and Thomas E. Murphy, "Porous silicon integrated Mach-Zehnder interferometer waveguide for biological and chemical sensing," Opt. Express 21, 19488-19497 (2013) (Year: 2013).*

(Continued)

*Primary Examiner* — Rhonda S Peace
(74) *Attorney, Agent, or Firm* — Lewis Roca Rothgerber Christie LLP

(57) ABSTRACT

A chemical sensor, including a porous optical waveguide. The loss or index of refraction, or both, of the porous waveguide is affected by the presence of one or more chemicals of interest.

8 Claims, 19 Drawing Sheets

(56) References Cited

U.S. PATENT DOCUMENTS

| | | | | |
|---|---|---|---|---|
| 6,995,572 | B2* | 2/2006 | Arndt | G08B 19/02 |
| | | | | 324/639 |
| 7,232,485 | B2* | 6/2007 | Jones | G01N 5/02 |
| | | | | 117/68 |
| 7,259,855 | B2* | 8/2007 | Fan | G01N 21/7746 |
| | | | | 250/339.07 |
| 7,394,961 | B2* | 7/2008 | Kornilovich | G02B 6/1225 |
| | | | | 216/24 |
| 7,446,880 | B2* | 11/2008 | Vollmer | G01N 21/23 |
| | | | | 356/480 |
| 7,595,890 | B2* | 9/2009 | Fan | G01N 21/7746 |
| | | | | 356/480 |
| 8,263,986 | B2* | 9/2012 | Hajj-Hassan | G01N 21/7703 |
| | | | | 257/14 |
| 8,506,887 | B2* | 8/2013 | Rong | G01N 21/552 |
| | | | | 356/446 |
| 8,920,729 | B2* | 12/2014 | Rong | G01N 21/552 |
| | | | | 385/12 |
| 9,352,543 | B2* | 5/2016 | Weiss | B41D 7/00 |
| 10,054,546 | B2 | 8/2018 | Stievater et al. | |
| 10,197,499 | B2* | 2/2019 | King | G01N 21/6428 |
| 10,228,280 | B2* | 3/2019 | Abel | G01N 21/05 |
| 2006/0234391 | A1* | 10/2006 | Weiss | G01N 33/54373 |
| | | | | 436/518 |
| 2010/0279886 | A1* | 11/2010 | Fauchet | G01N 21/7743 |
| | | | | 506/9 |
| 2011/0056398 | A1 | 3/2011 | Weiss et al. | |
| 2017/0059469 | A1 | 3/2017 | Hutter | |
| 2018/0076341 | A1* | 3/2018 | Faur | H01L 31/02168 |
| 2019/0285552 | A1* | 9/2019 | Zhang | G02B 6/1225 |

OTHER PUBLICATIONS

Bomchil, G. et al., "Porous silicon: The material and its applications to SOI technologies", Microelectronic Engineering, 1988, pp. 293-310, Elsevier Science Publishers B.V. (North Holland).

Caroselli, Raffaele et al., "Experimental study of the sensitivity of a porous silicon ring resonator sensor using continuous in-flow measurements", Optics Express, Dec. 5, 2017, pp. 31651-31659, vol. 25, No. 25, Journal.

Green, William M.J., "Enabling Chip-Scale Trace-Gas Sensing Systems With Silicon Photonics", IBM T.J. Watson Research Center, Aug. 25, 2017, pp. 1-32, IBM Corporation.

Ouyang, Huimin et al., "Biosensing using Porous Silicon Photonic Bandgap Structures", Proc. of SPIE, 2005, pp. 600508-1 through 600508-15, vol. 6005.

Rodriguez, Gilberto A. et al., "Porous silicon ring resonator for compact, high sensitivity biosensing applications", Optics Express, Mar. 9, 2015, vol. 23, No. 6, Optical Society of America.

Sato, N. et al., "High-Quality Epitaxial Layer Transfer (ELTRAN) by Bond and Etch-Back of Porous Si", Oct. 1995, pp. 176-177, Proceedings 1995 IEEE International SOI Conference.

Tombez, L. et al., "Methane absorption spectroscopy on a silicon photonic chip", Optica, Nov. 2017, pp. 1322-1325, vol. 4, No. 11, Optical Society of America.

Website: "Porous silicon", Wikipedia, https://en.wikipedia.org/wiki/Porous_silicon, printed Apr. 1, 2019, 8 pages.

Azuelos, Paul et al., "Theoretical investigation of Vernier effect based sensors with hybrid porous silicon-polymer optical waveguides", Journal of Applied Physics, Apr. 10, 2017, 21 pages, vol. 121, No. 14, American Institute of Physics.

Hutter, Tanya et al., "Theoretical Study of Porous Silicon Waveguides and Their Applicability for Vapour Sensing", Excerpt from the Proceedings of the COMSOL Conference 2010 Paris, Jan. 2010, 7 pages.

International Search Report and Written Opinion of the International Searching Authority, dated Jul. 16, 2019, Corresponding to PCT/IB2019/000256, 21 pages.

Poffo, L. et al., "Integrated Racetrack Micro-Resonator Based on Porous Silicon Ridge Waveguides", 2016 18th International Conference on Transparent Optical Networks, Jul. 10, 2016, pp. 1-2, IEEE.

Rea, Ilaria et al., "A porous silicon-based Bragg grating waveguide sensor for chemical monitoring", Sensors and Actuators B: Chemical, Sep. 7, 2008, pp. 39-43, vol. 139, No. 1, Elsevier B.V.

Saharil, Farizah et al., "Dry adhesive bonding of nanoporous inorganic membranes to microfluidic devices using the OSTE(+) dual-cure polymer", Journal of Micromechanics & Microengineering, Jan. 21, 2013, pp. 1-14, vol. 23, No. 2, Institute of Physics Publishing.

Zhao, Yiliang et al., "Resonant Photonic Structure in Porous Silicon for Biosensing", Proc. of SPIE, Feb. 23, 2017, pp. 100810D-1 through 100810D-10, vol. 10081, International Society for Optical Engineering.

* cited by examiner

POROUS SILICON SENSOR

CROSS-REFERENCE TO RELATED APPLICATION(S)

The present application claims priority to and the benefit of U.S. Provisional Application No. 62/642,435, filed Mar. 13, 2018, entitled "POROUS SILICON SENSOR", the entire content of which is incorporated herein by reference.

FIELD

One or more aspects of embodiments according to the present disclosure relate to sensors, and more particularly to a porous silicon sensor for sensing one or more chemicals.

BACKGROUND

Chemical sensors are used in a wide range of applications, including in industrial process monitoring, and in safety equipment, in which they may be used to detect toxic gases. Related art chemical sensors may have various disadvantages, including, for example, high power consumption, or large mass or volume. Thus, there is a need for an improved chemical sensor.

SUMMARY

In some embodiments of the present disclosure there is provided a system, including: a substrate, and a waveguide on the substrate, the waveguide having a porous portion.

In some embodiments, the waveguide has a nonporous portion.

In some embodiments, the system includes an optical ring resonator including the waveguide.

In some embodiments, the system includes a Mach-Zehnder interferometer having a first arm and a second arm, the first arm including the waveguide.

In some embodiments, the porosity of the porous portion of the waveguide is at least 15%.

In some embodiments, the porous portion of the waveguide has one or more meanders.

In some embodiments: the substrate is a silicon substrate, the waveguide is composed of silicon, and the porous portion of the waveguide is composed of porous silicon, the system further including a layer of silicon dioxide directly on the substrate, a portion of the waveguide being directly on the layer of silicon dioxide.

In some embodiments, the substrate is a silicon substrate, the system further including a layer of porous silicon on a portion of the substrate, a portion of the waveguide being on the layer of porous silicon, the layer of porous silicon having a lower index of refraction than the porous portion of the waveguide.

In some embodiments, a portion of the waveguide is separated by a gap from any layers below the waveguide.

In some embodiments, the system includes a photonic integrated circuit, the photonic integrated circuit including: the substrate, the waveguide, and an element selected from the group consisting of laser sources, photodetectors, power splitters, combiners, and wavelength filters.

In some embodiments, the waveguide is a first waveguide, the system including: a second waveguide having a porous portion; a sample cell containing the porous portion of the first waveguide, the sample cell being configured to expose the porous portion of the first waveguide to a chemical entity to be analyzed; and a reference cell containing the porous portion of the second waveguide, the reference cell being configured to avoid exposure of the porous portion of the second waveguide to the chemical entity to be analyzed.

In some embodiments, the system further includes a chromatography column configured to convey a chemical entity to be analyzed to the porous portion.

In some embodiments, the system further includes, on surfaces of a plurality of pores of the porous portion, a material having an adsorption coefficient, for a chemical of interest, differing from an adsorption coefficient of the surfaces of the pores, for the chemical of interest.

In some embodiments of the present disclosure there is provided a method for fabricating a waveguide having a porous portion and a nonporous portion, the method including: fabricating a starting wafer, the starting wafer including a substrate and a top surface composed in part of porous silicon and in part of nonporous silicon, and etching the top surface of the starting wafer to form the waveguide.

In some embodiments, the fabricating of the starting wafer includes: fabricating a first wafer, the first wafer including: a silicon substrate, and a layer of silicon dioxide on the silicon substrate; fabricating a second wafer, the second wafer including: a silicon substrate, a high-porosity porous silicon layer on the silicon substrate, and a low-porosity porous silicon layer on the high-porosity porous silicon layer, the low-porosity porous silicon layer having lower porosity than the high-porosity porous silicon layer; bonding together the first wafer and the second wafer to form a bonded assembly; and cleaving the bonded assembly at the low-porosity porous silicon layer to form a bonded wafer, the bonded wafer having a top surface of porous silicon.

In some embodiments: the second wafer further includes a layer of nonporous silicon on the low-porosity porous silicon layer, and the bonded wafer further includes the layer of nonporous silicon below top surface of porous silicon, the method further including, before etching the starting wafer to form the waveguide: etching, over a portion of the bonded wafer, the top surface of the bonded wafer down to the layer of nonporous silicon; and growing nonporous silicon on the portion of the bonded wafer.

In some embodiments, the fabricating of the starting wafer includes: etching, in a first process, a top surface of a silicon wafer, to form a first porous silicon layer, etching, in a second process, the top surface of the silicon wafer, to form a second porous silicon layer below the first porous silicon layer, the second porous silicon layer having a higher porosity than the first porous silicon layer.

In some embodiments, the first process includes performing an electrochemical etch at a first current density, and the second process includes performing an electrochemical etch at a second current density.

In some embodiments, the second current density is greater than the first current density.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
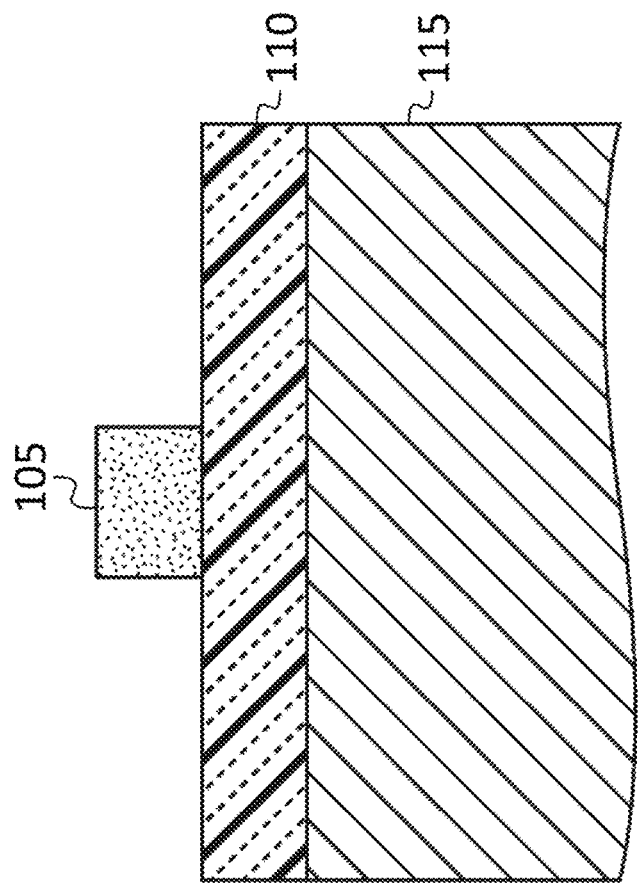
FIG. 1A is a schematic cross-sectional view of a porous waveguide, according to an embodiment of the present disclosure.

The detailed description set forth below in connection with the appended drawings is intended as a description of exemplary embodiments of a porous silicon sensor provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Chemical sensing (i.e., detecting, identifying, and determining of chemical elements or compounds) may be accomplished with light guided by a waveguide (or "optical waveguide") when the light interacts with the chemical being sensed. As used herein, "a chemical" means a chemical element or a chemical compound, and "determining" means measuring the concentration of. When a waveguide is fabricated from a porous material, the light confined in the waveguide may interact with chemicals in the pores in the waveguide and on the surface of the porous material; this interaction may make possible the detection of certain chemicals of interest. As such, a porous waveguide 105, such as a porous strip waveguide 105 (FIG. 1A) or a porous rib waveguide 105 (FIG. 1B) may be configured as a chemical sensor. The porous waveguide 105 of FIG. 1A or FIG. 1B may be formed on a layer 110 of silicon oxide (e.g., silicon dioxide) as shown, or on a layer of another material with a suitable index of refraction, or "refractive index", (e.g., with an index of refraction that is less than that of the porous waveguide 105), as discussed in further detail below. When light propagating within the porous waveguide 105 interacts with a chemical of interest, e.g., methane, the interaction may affect the effective index of refraction of the porous waveguide 105, or the loss in the porous waveguide 105. For example, methane may have an absorption line near 1651 nm, with a line width of about 0.05 nm. Light with a wavelength at the center of the absorption line may experience increased loss when propagating in the porous waveguide 105 if the pores contain methane, and light with a wavelength slightly offset from the center of the absorption line may experience some attenuation, as well as a change in the effective index of refraction.

In some embodiments, the porous waveguide 105 is immersed in or otherwise exposed to a "chemical entity to be analyzed", which, as used herein, is a substance or mixture to be characterized by the sensor (e.g., within which chemicals of interest are to be detected, determined, or identified or within which more than one of detecting, determining, and identifying is to be performed). The chemical entity to be analyzed may be, for example, a gas mixture such as air, or be a solution in water, or other solvents. The chemical of interest may be a volatile element or compound such as a hydrocarbon or other organic molecule. The refractive index of porous silicon, Np, is a weighted average of (i) the refractive index of the crystalline silicon of the porous waveguide 105 and (ii) the refractive index of the contents of the pores, e.g., the chemical entity to be analyzed. The refractive index Np of the porous silicon of the porous waveguide 105 may be engineered and fabricated to be higher than the refractive index of the surroundings of the porous waveguide 105, e.g., the silicon oxide layer underneath the porous waveguide 105, and the air, water or other solvent it is to be immersed in, by tuning the pore size and porosity, so that the waveguide will support the propagation of confined optical modes. In some embodiments the surfaces of the pores of the porous waveguide 105 are coated with a material to which the chemical of interest adheres preferentially (e.g., having a different adsorption coefficient for the chemical of interest, than the surface of the pore), so that the chemical of interest, if present, produces a greater optical effect (e.g., attenuation or phase delay of the guided light) than other chemicals. The coating may be a liquid phase material such as a high molecular weight wax, a polysiloxane or polyethyleneimine or it may be a surface coating such as bis(trimethylsilyl)amine (HMDS). The silicon oxide layer has an index of refraction (e.g. 1.4 at wavelength of 1550 nm), which is lower than that of crystalline silicon (e.g. 3.4 at the same wavelength of 1550 nm), enabling the operation of silicon optical waveguides (e.g., based on the principle of total internal reflection).

Effects on the light (e.g., attenuation or phase delay of the guided light) may be detected using various methods. For example, a change in the effective index of refraction may be detected using a chemical-sensitive interference or resonance device, such as a chemical-sensitive Mach-Zehnder interferometer, a chemical-sensitive ring resonator or chemical-sensitive Bragg grating. In the case of a chemical-sensitive Mach-Zehnder interferometer is used, one arm of the Mach-Zehnder interferometer may be a control arm that is sealed to prevent contact with the chemical of interest; when the other arm (the sensing arm, which may have a porous portion) is exposed to a chemical entity to be analyzed containing the chemical of interest, the relative phase shift between the two arms of the interferometer may be observable as fringes (e.g., variations in the intensity detected by one or two photodetectors at one or both outputs of the Mach-Zehnder interferometer). A chemical-sensitive ring resonator or a chemical-sensitive Bragg grating may be fabricated by making part or all of the ring resonator or Bragg grating porous, and providing a mechanism for exposing some or all of the porous part to the chemical entity to be analyzed.

When a chemical of interest is present, it may cause the resonant peak (or peaks) of the ring resonator or Bragg grating to shift, causing a change in the transmissivity of a photonic circuit containing the ring resonator or Bragg grating. As used herein, a "photonic circuit" is an apparatus including one or more optical elements (e.g., gratings, couplers, resonators, light sources, or photodetectors) connected by one or more waveguides. Referring to FIG. 1C, such a photonic circuit may include a waveguide 125 containing, at a point along its length, a chemical-sensitive Bragg grating 130. The waveguide 125 may be a nonporous waveguide except for a porous portion overlapping some or all of the Bragg grating 130. The transmissivity of the waveguide at the wavelength of probe light propagating through it may then increase if the reflectance peak of the Bragg grating 130 is shifted (by the presence of a chemical of interest, or by the absence of a previously present chemical of interest) away from the wavelength of the probe light or decrease if the reflectance peak of the Bragg grating 130 is shifted toward the wavelength of the probe light.

Figure 1B:
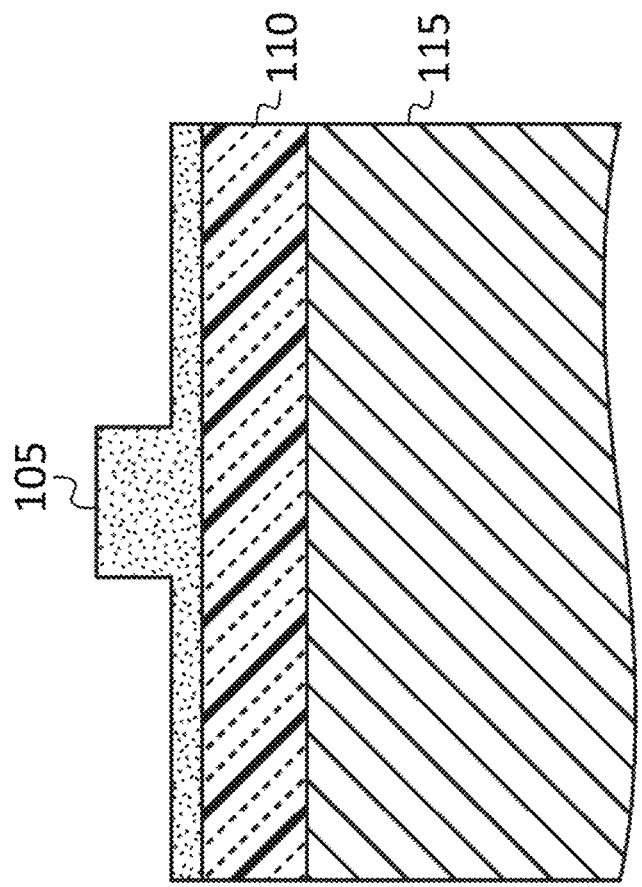
FIG. 1B is a schematic cross-sectional view of a porous waveguide, according to an embodiment of the present disclosure.
Figure 1F:
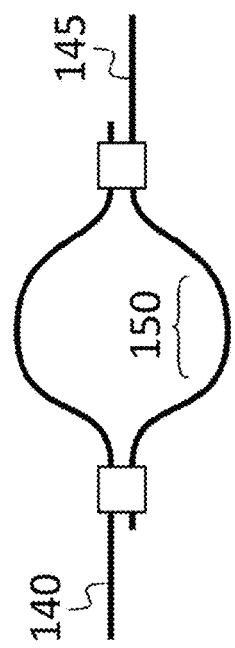
FIG. 1F is a schematic view of a photonic circuit, according to an embodiment of the present disclosure.
Figure 1C:
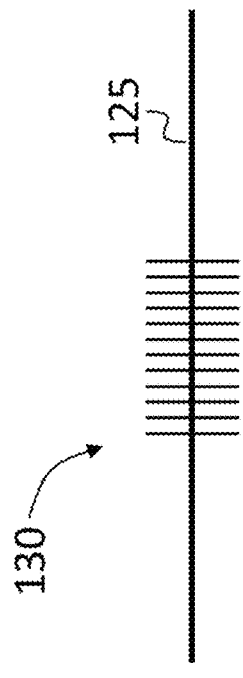
FIG. 1C is a schematic view of a photonic circuit, according to an embodiment of the present disclosure.
Figure 1D:
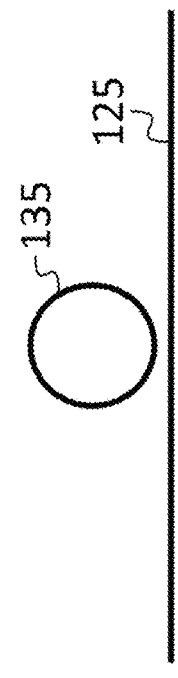
FIG. 1D is a schematic view of a photonic circuit, according to an embodiment of the present disclosure.
Figure 1E:
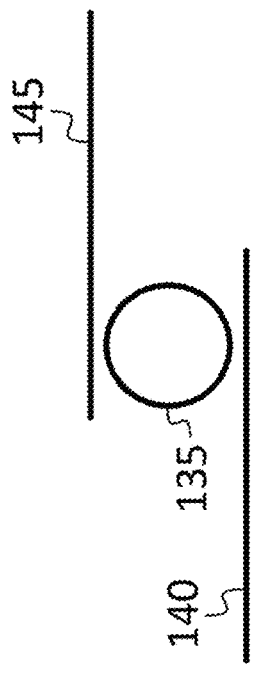
FIG. 1E is a schematic view of a photonic circuit, according to an embodiment of the present disclosure.

Similarly, referring to FIG. 1D, a ring resonator 135 coupled to a waveguide may absorb optical power at its resonant peak. A photonic circuit for sensing chemicals may therefore include a waveguide (e.g., a straight waveguide) 125 (which may be a nonporous waveguide) coupled (by evanescent wave coupling) to a chemical-sensitive ring resonator 135. In such a configuration, the transmissivity of the waveguide 125 at the wavelength of probe light propagating through it may decrease if the resonant peak of the ring resonator 135 is shifted toward the wavelength of the probe light or increase if the resonant peak of the ring resonator 135 is shifted away from the wavelength of the probe light. Referring to FIG. 1E, in another embodiment a first waveguide 140 (e.g., an input waveguide) may be coupled to a second waveguide 145 (e.g., an output waveguide) through a chemical-sensitive ring resonator 135. In such an embodiment, the transmissivity from the input waveguide 140 to the output waveguide 145 may be greatest when the resonant peak of the ring resonator 135 is at the wavelength of the probe light; the transmissivity may increase if the resonant peak of the ring resonator 135 is shifted toward the wavelength of the probe light or decrease if the resonant peak of the ring resonator 135 is shifted away from the wavelength of the probe light. Referring to FIG. 1F, in another embodiment, a Mach-Zehnder interferometer may have a peak in the transmissivity from a first waveguide 140 (e.g., an input waveguide) to a second waveguide 145 (e.g., an output waveguide, at a second output of the beam combiner of the Mach-Zehnder interferometer) when constructive interference occurs at the second output of the beam combiner. One arm of the Mach-Zehnder interferometer may have a chemical-sensitive (i.e., porous) portion 150. The transmissivity of the Mach-Zehnder interferometer from the input waveguide 140 to the output waveguide 145 may increase if the transmissivity peak of the Mach-Zehnder interferometer is shifted toward the wavelength of the probe light or decrease if the transmissivity peak of the Mach-Zehnder interferometer is shifted away from the wavelength of the probe light.

In other embodiments, changes in loss in the porous waveguide 105 may be detected by feeding one end of the porous waveguide 105 with light from a constant-intensity light source and monitoring the intensity of the light at the other end of the porous waveguide 105 with a photodetector. A tuned light source (e.g., a tunable laser) may be used to vary the wavelength of the light (e.g., over a range spanning, for example, 0.05 nm, or 0.10 nm, or 1 nm in wavelength) so as to resolve an absorption line of the chemical of interest, and thereby achieve selectivity of detection and avoid confusion, for example, between the chemical of interest and other chemicals that may also be present in the region sensed by the optical mode.

Figure 2:
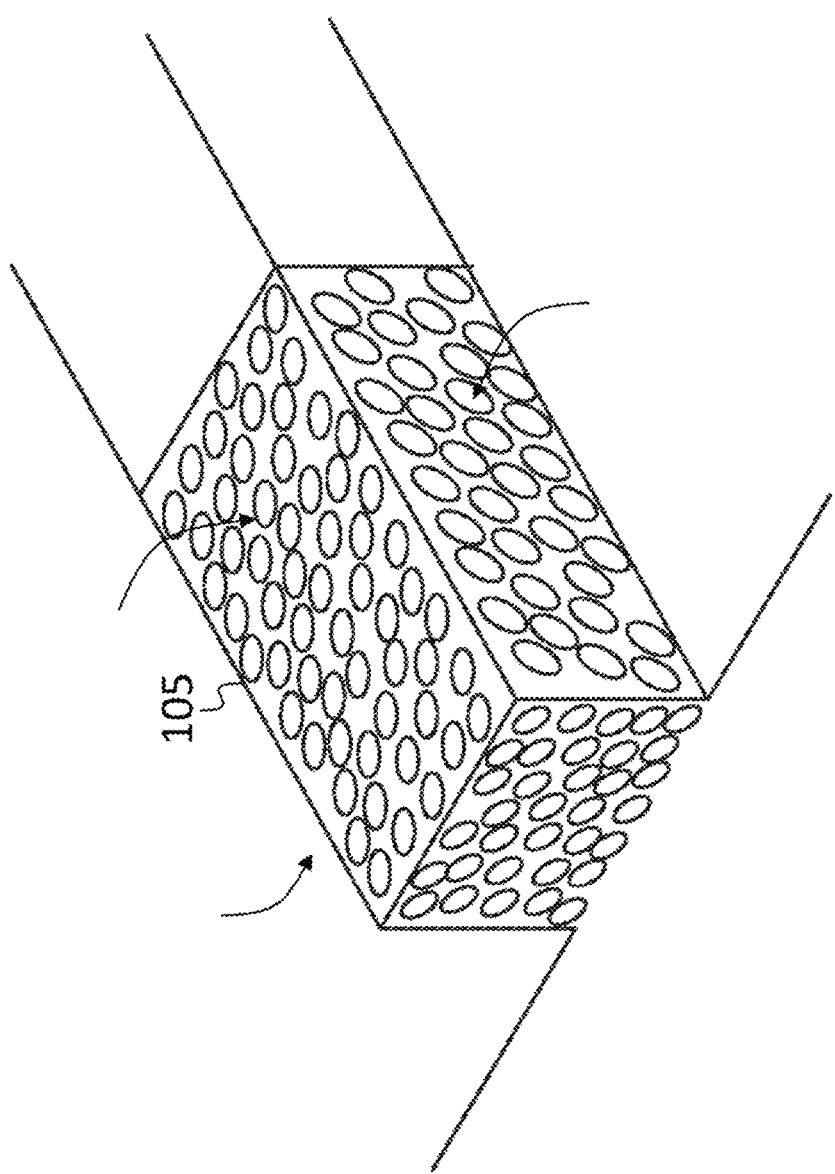
FIG. 2 is a schematic perspective view of a waveguide having a porous portion, according to an embodiment of the present disclosure.

FIG. 2 shows a porous strip waveguide. The porous silicon of the porous strip waveguide has the physical characteristics of an open-cell foam (e.g., a sponge) including a number of pores in fluid communication with each other. The porous silicon may be substantially isotropic. The curved arrows of FIG. 2 represent paths chemicals may take to enter the pores of the porous strip waveguide.

Figure 3A:
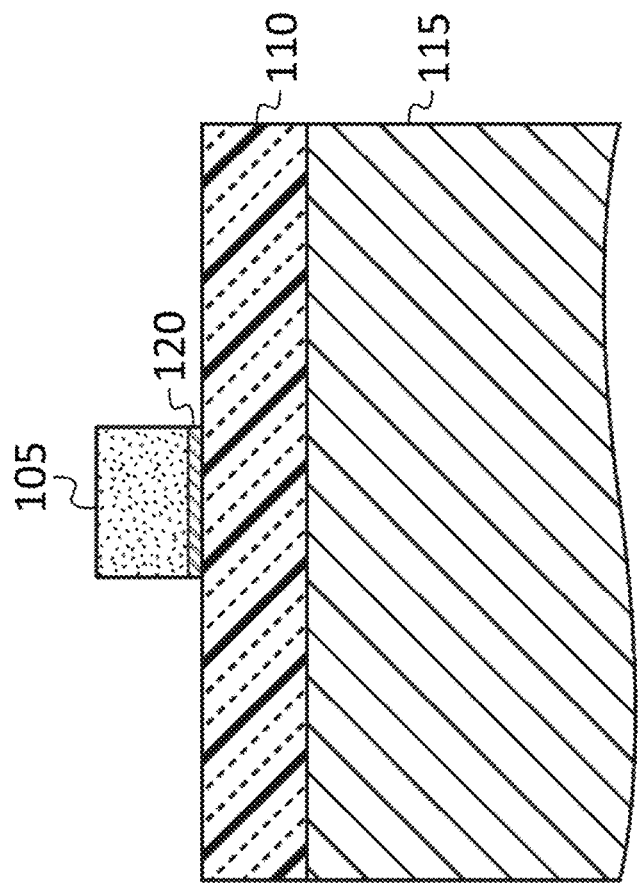
FIG. 3A is a schematic cross-sectional view of a porous waveguide, according to an embodiment of the present disclosure.
Figure 3B:
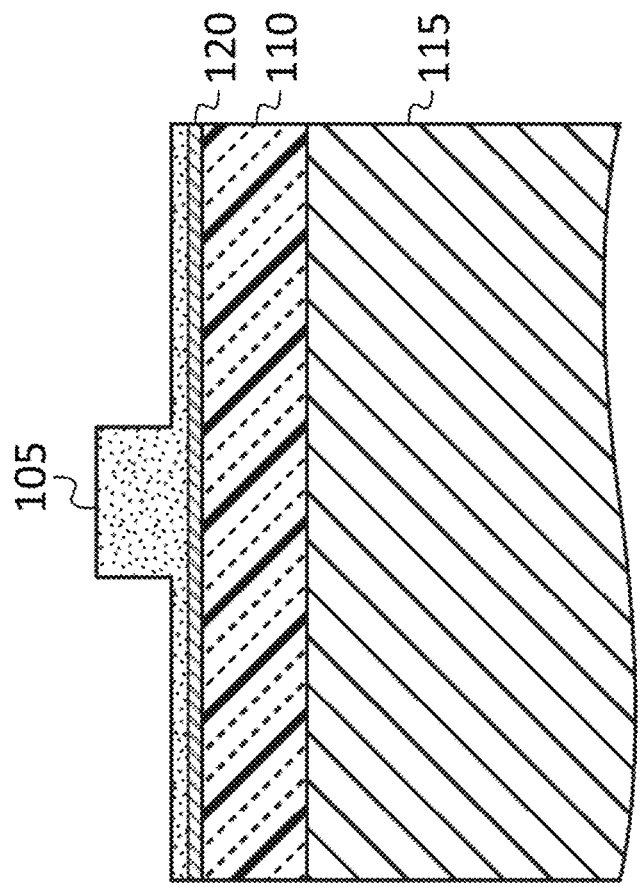
FIG. 3B is a schematic cross-sectional view of a porous waveguide, according to an embodiment of the present disclosure.

FIGS. 3A and 3B show a porous strip waveguide and a porous rib waveguide respectively, each having a thin layer of crystalline silicon between the porous silicon and the silicon oxide. The thin layer of crystalline silicon may be sufficiently thin to not perturb the mode shape of the porous silicon waveguide significantly. A starting wafer suitable for fabricating such a waveguide may be fabricated in a process similar to a process that may be used to fabricate a silicon-on-insulator (SOI) wafer (an example of which is described in the following publication, which is hereby incorporated herein by reference: Sato, N., et al., *High-quality epitaxial layer transfer (ELTRAN) by bond and etch-back of porous Si*, Proceedings IEEE International SOI Conference, 3-5 Oct. 1995, Tucson, Ariz.). For example, a first wafer may consist of a layer of thermal oxide on a crystalline silicon substrate, and a second wafer may consist of several layers on a (nonporous) crystalline silicon substrate, the several layers including (i) a high-porosity porous silicon layer on the crystalline silicon substrate, (ii) a low-porosity porous silicon layer on the high-porosity porous silicon layer, and (iii) a thin (e.g., 50 nm thick) layer of epitaxially grown crystalline silicon 120 on the low-porosity porous silicon layer. The wafers may be bonded together so that the thin layer of epitaxially grown crystalline silicon of the second wafer is in contact with the thermal oxide layer of the first wafer.

The high-porosity porous silicon layer of the second wafer may then be used as a cleave plane, along which the bonded assembly may be cleaved, leaving a bonded wafer consisting of (i) the first substrate 115, (ii) the thermal oxide layer 110, on the first substrate, (iii) the thin layer of epitaxially grown crystalline silicon 120 of the second wafer, on the thermal oxide layer, and (iv) the low-porosity porous silicon layer (from which the porous waveguide 105 may be formed), on the thin layer of epitaxially grown crystalline silicon. This structure may form the starting wafer for fabricating the waveguides of FIGS. 3A and 3B (e.g., by lithographically patterning the low-porosity porous silicon layer to form rib and/or strip waveguide structures). In some embodiments the thin layer of epitaxially grown crystalline silicon may be omitted from the second wafer and may therefore be absent from the porous waveguide structure (e.g., as in FIGS. 1A and 1B). Nonporous waveguides may be formed on the same chip, for example, by etching, over a portion of the bonded wafer, the porous silicon down to the thin layer of epitaxially grown crystalline silicon, increasing the thickness of this crystalline silicon layer (e.g., to a thickness of 3 microns, using epitaxial growth), and then etching the layer to form rib or strip waveguides.

The dimensions and porosity of the porous waveguide 105 may be selected according to any of several criteria. For example, nonporous silicon waveguides in the system may have (i) dimensions of 3 microns by 3 microns (for a strip waveguide) or a width of 3 microns and a height, above a 1.8 micron thick slab, of 1.2 microns, or (ii) dimensions of 400 nm by 220 nm (for a strip waveguide) or a width of 400 nm and a height, above a 90 nm thick slab, of 130 nm. For convenience in coupling the porous waveguide 105 to a nonporous waveguide, the dimensions of the porous waveguide 105 may be selected to be the same, or substantially the same, as those of the nonporous silicon waveguide to which the porous waveguide 105 is to be coupled. The nonporous silicon waveguides may be used, for example, to convey light from a laser to the porous waveguide 105 and to convey light from the porous waveguide 105 to a nonporous beam combiner in a Mach-Zehnder interferometer, or to a photodetector. An adiabatic transition taper or antireflection coating layer may be used at the junction of porous and nonporous silicon waveguide to reduce optical scattering and reflection.

The pore size and porosity of the porous waveguide 105 may be selected to achieve acceptable sensitivity. For example, insufficient porosity may result in low sensitivity as a result of the reduced volume within which a chemical of interest may interact with the light in the waveguide. Porosity that is too high may result in poor performance as a result of poor optical coupling to nonporous silicon waveguides, or as a result of a mode shape that extends significantly into the silicon oxide layer. A lengthened porous waveguide 105 (e.g., a meandering porous waveguide 105) may be used to increase sensitivity. A numerical modeling tool, such as Synopsis Rsoft or Lumerical MODE Solutions, may be used to assess the effects of changes in the dimensions and porosity of the porous waveguide 105 and to select dimensions and a porosity that result in acceptable performance.

An analytical system based upon the optical porous silicon sensor could have a reference cell in a parallel optical arm and a chemical of interest may thus be detected or measured by the difference between the response of the sample cell and the reference cell. The reference cell may be on the same silicon chip as the sample cell. This system makes a more sensitive and accurate device. The reference cell could be flooded with an inert gas in order to establish a constant reference environment for the reference sensor.

The sensor may be used in continuous flow or sample mode. By continuous mode is meant that the sensor is continuously exposed to the chemical entity to be analyzed. In sample mode, the sensor is exposed periodically to the chemical entity to be analyzed by, for example, injection of a vapor sample into the sensor cell. An inert gas may flow continuously over the sensor. In this sample mode the rate of adsorption and desorption will be apparent from the curve of the sensor response with time. In other words, from the shape of the response peak, the adsorption/desorption hysteresis may be observed, and this may be characteristic of the chemical of interest. Additionally, if two identical or similar sensors are used simultaneously but operated under different conditions (for example, at different temperatures), the differential adsorption/desorption response may be characteristic of the chemical of interest. When differential sensing and measurements are made, it is convenient to construct the more than one sensor devices on the same silicon chip.

Figure 4A:
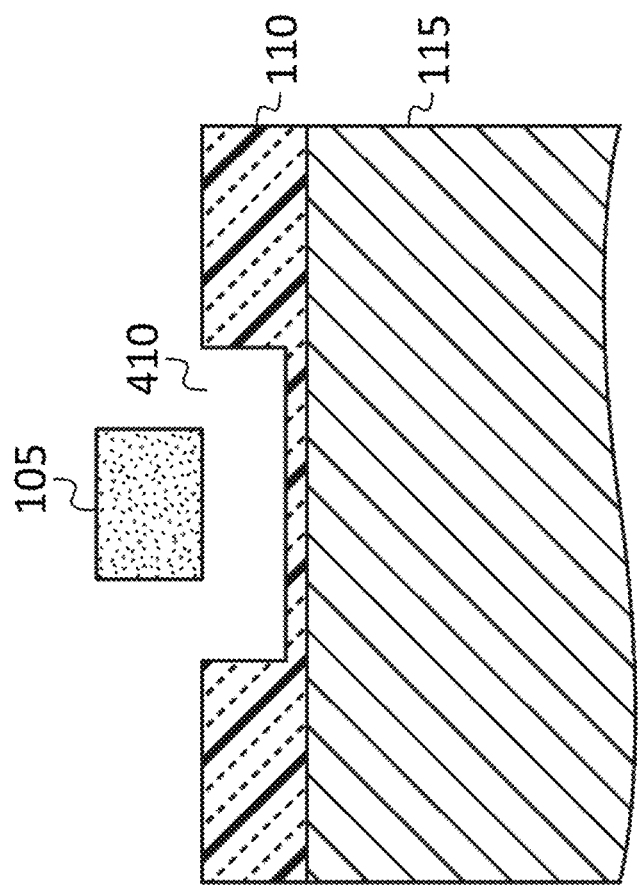
FIG. 4A is a schematic cross-sectional view of a porous waveguide, according to an embodiment of the present disclosure.
Figure 4B:
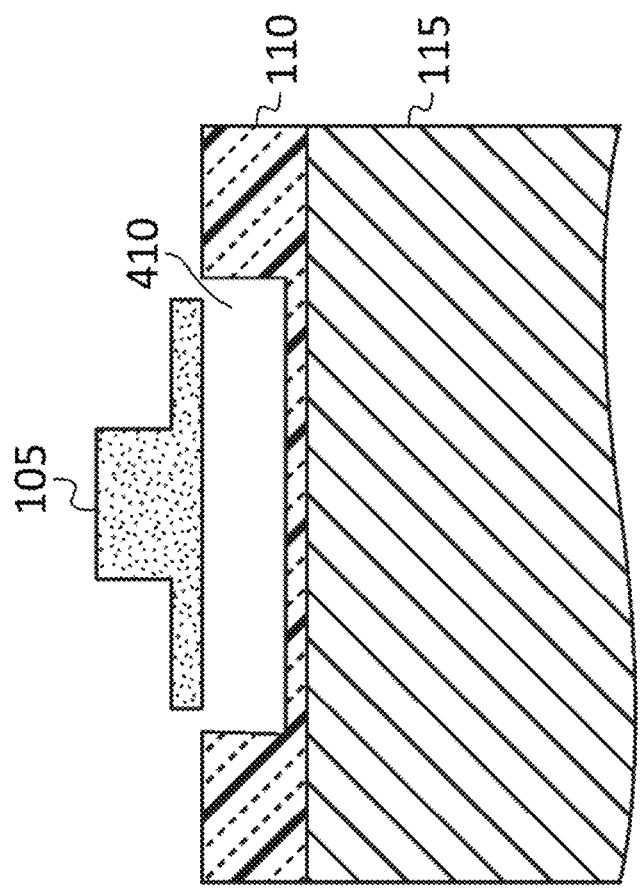
FIG. 4B is a schematic cross-sectional view of a porous waveguide, according to an embodiment of the present disclosure.

Referring to FIGS. 4A and 4B, in some embodiments a cavity 410 is formed (e.g., in the silicon oxide) under a portion of a porous waveguide 105 (e.g., so that the porous waveguide 105 forms a bridge across the cavity), so that the waveguide is separated from any layers below it by a gap, exposing an additional (lower) surface of the porous waveguide 105 to the chemical of interest, and increasing the sensitivity of the chemical sensor.

Figure 5:
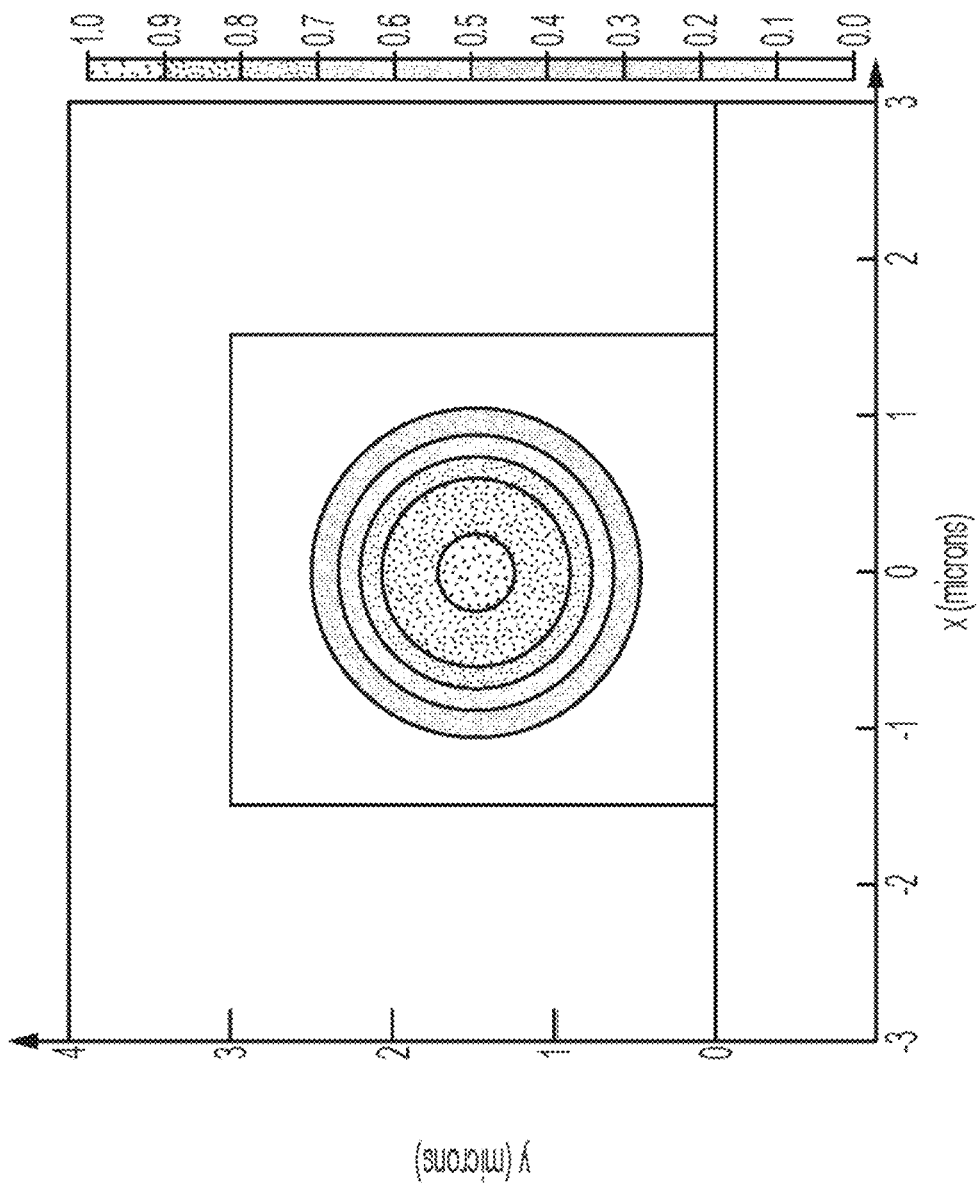
FIG. 5 is a simulated mode pattern, according to an embodiment of the present disclosure.

FIG. 5 shows a mode profile of the waveguide structure in FIG. 1A at a wavelength of 1550 nm, assuming 30% porosity. As used herein, the "porosity" of a porous waveguide is one less the volume fraction that is solid material (e.g., crystalline silicon). For example, a porous waveguide that is 70% by volume crystalline silicon has a porosity of 30%.

Figure 6A:
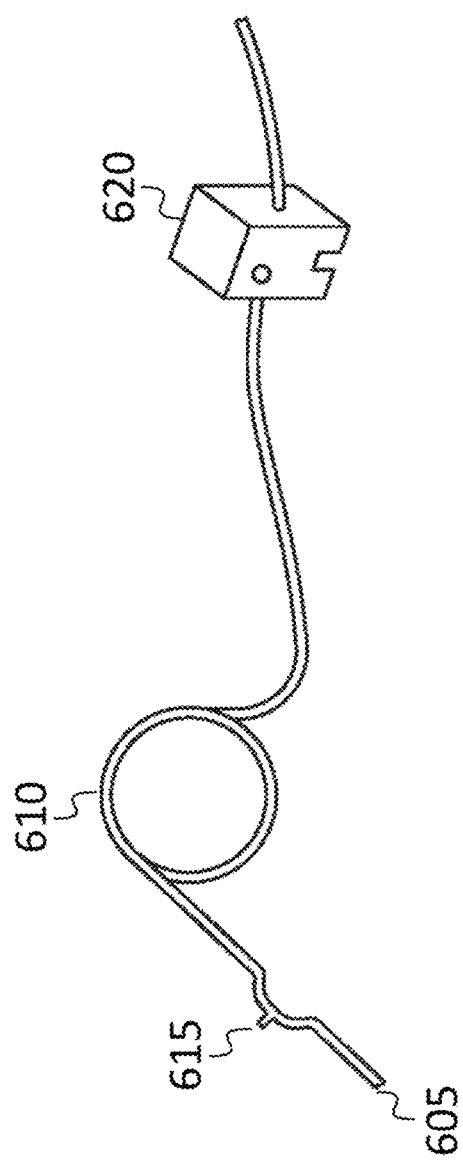
FIG. 6A is a schematic perspective view of a system for chemical analysis, according to an embodiment of the present disclosure.
Figure 6B:
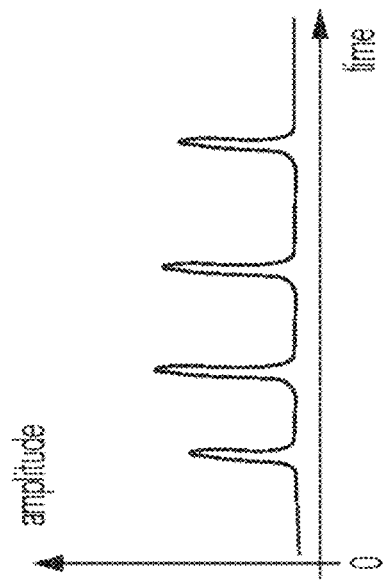
FIG. 6B is a graph of output as a function of time, according to an embodiment of the present disclosure.
Figure 6C:
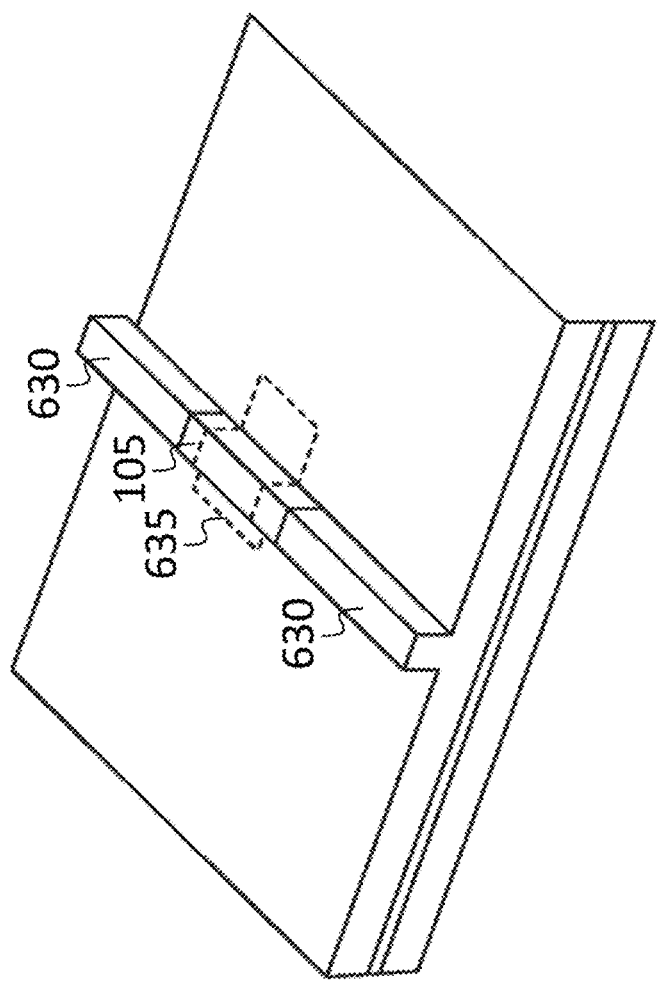
FIG. 6C is a schematic perspective view of a waveguide having a porous portion, according to an embodiment of the present disclosure.

FIG. 6 shows a chromatography system including a porous silicon waveguide chemical sensor. An inert gas such as nitrogen or argon is supplied to an inlet 605 of a long tube 610 (or "column" or "chromatography column") (e.g., a coiled tube of several meters), and passes continuously through the tube. The tube is very thin and either has its internal wall coated with adsorbing material or is packed with an adsorbing material. The adsorbing material may be an inert material coated with a high molecular weight organic polymer called the liquid phase. Where there is no liquid phase the techniques may be referred to as GC (gas chromatography) and where there is a liquid phase it may be referred to as GLC (gas liquid chromatography). At the injection port 615 the mixture of materials (gases or vapors) is injected as a small batch and this is carried into the chromatography tube. Typically, the tube is in a constant temperature box called an oven and the oven is often but not always heated to several hundred degrees Celsius. The individual components of the mixture being analyzed are adsorbed and desorbed as they pass with the carrier gas through the chromatography tube and they each move through the column at a rate determined by their adsorption coefficients. In this way they are separated in time and may be detected and measured as they leave the tube. A porous silicon waveguide chemical sensor such as one of those described herein may be employed as shown to detect the chemical components as they leave the tube. Each such component of the mixture may generate a response peak 625 in the output (FIG. 6B) as it leaves the tube, if it produces a response in the chemical sensor 620. FIG. 6C shows the chip in the chemical sensor 620, in some embodiments. The chip has a waveguide with a porous portion 105 and two nonporous portions 630. A region 635 of the surface of the chip is flooded with the gas leaving the tube.

Figure 7A:
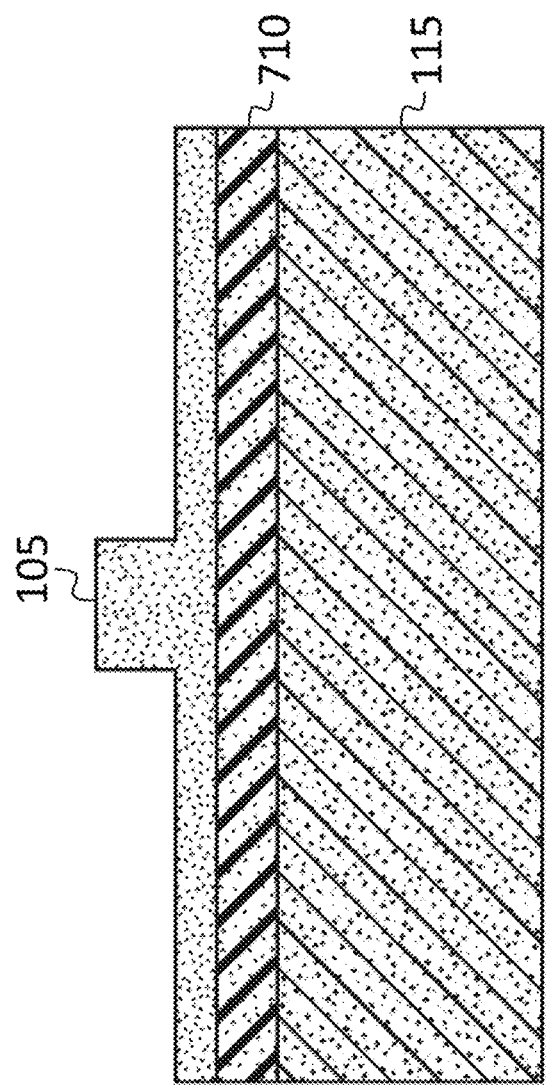
FIG. 7A is a schematic cross-sectional view of a porous waveguide, according to an embodiment of the present disclosure.
Figure 7B:
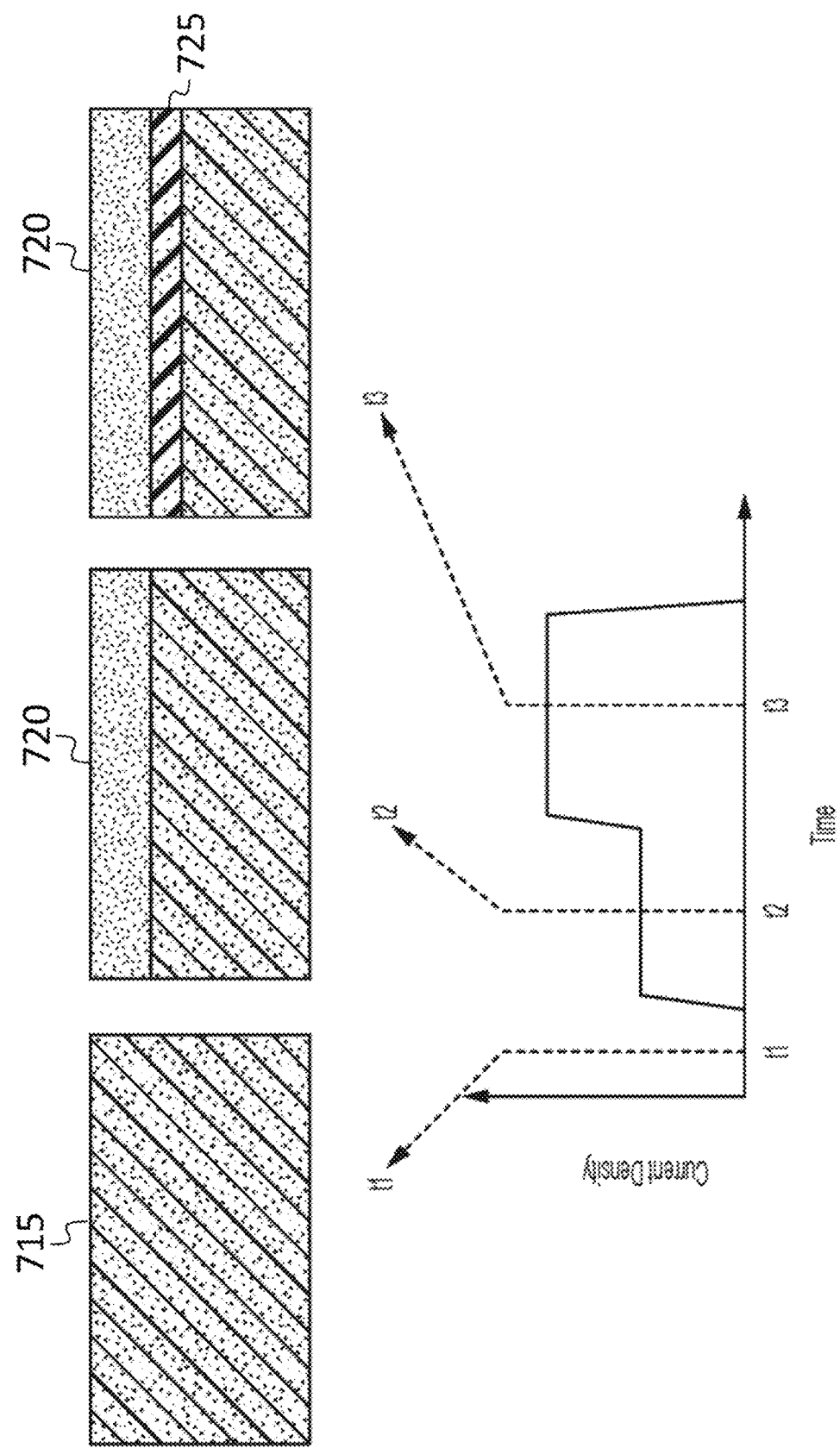
FIG. 7B is a schematic etching process diagram, according to an embodiment of the present disclosure.

In some embodiments a fabrication method different from that described in the context of FIGS. 3A and 3B is used, resulting in a structure like that of FIG. 7A, for example. In the embodiment of FIG. 7A, the porous waveguide 105 (a rib waveguide in the example of FIG. 7A; in some embodiments an analogous process is used to fabricate a strip waveguide) is on a layer 710 of higher-porosity silicon (i.e., of silicon having higher porosity, and a lower index or refraction, than the porous waveguide 105), which in turn is on a silicon substrate (e.g., a crystalline silicon substrate) 115. Referring to FIG. 7B, a starting wafer for forming the structure of FIG. 7A may be formed from a silicon wafer 715, by first etching a top surface of the silicon wafer 715 (e.g., using an electrochemical etching process (e.g., in hydrofluoric acid (HF)) at a first etching current density, to form a first layer 720 of porous silicon, then continuing to etch the silicon wafer (e.g., using the same electrochemical etching process, with a second etching current density, greater than the first etching current density) to form a second layer 725 of porous silicon below the first layer 720 of porous silicon, the second layer 725 of porous silicon having higher porosity, and a lower index or refraction, than the first layer 720 of porous silicon.

Figure 7C:
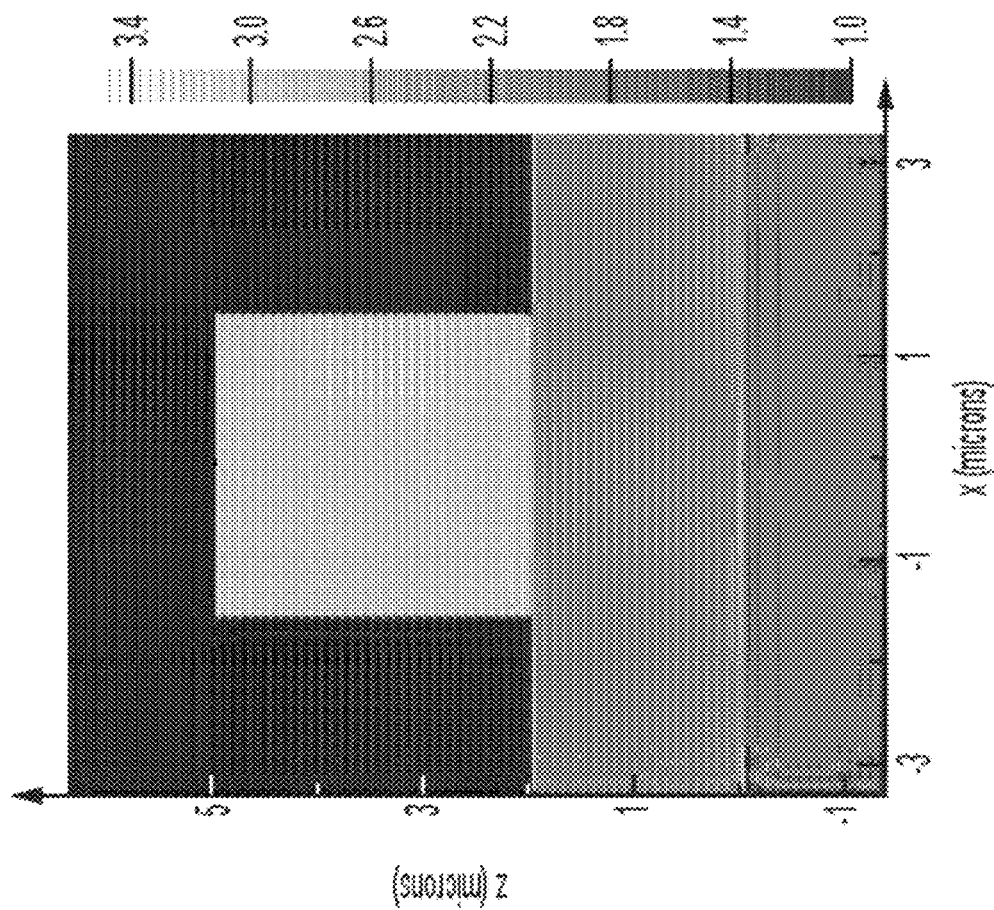
FIG. 7C is a schematic cross-sectional view of a porous waveguide, according to an embodiment of the present disclosure.
Figure 7D:
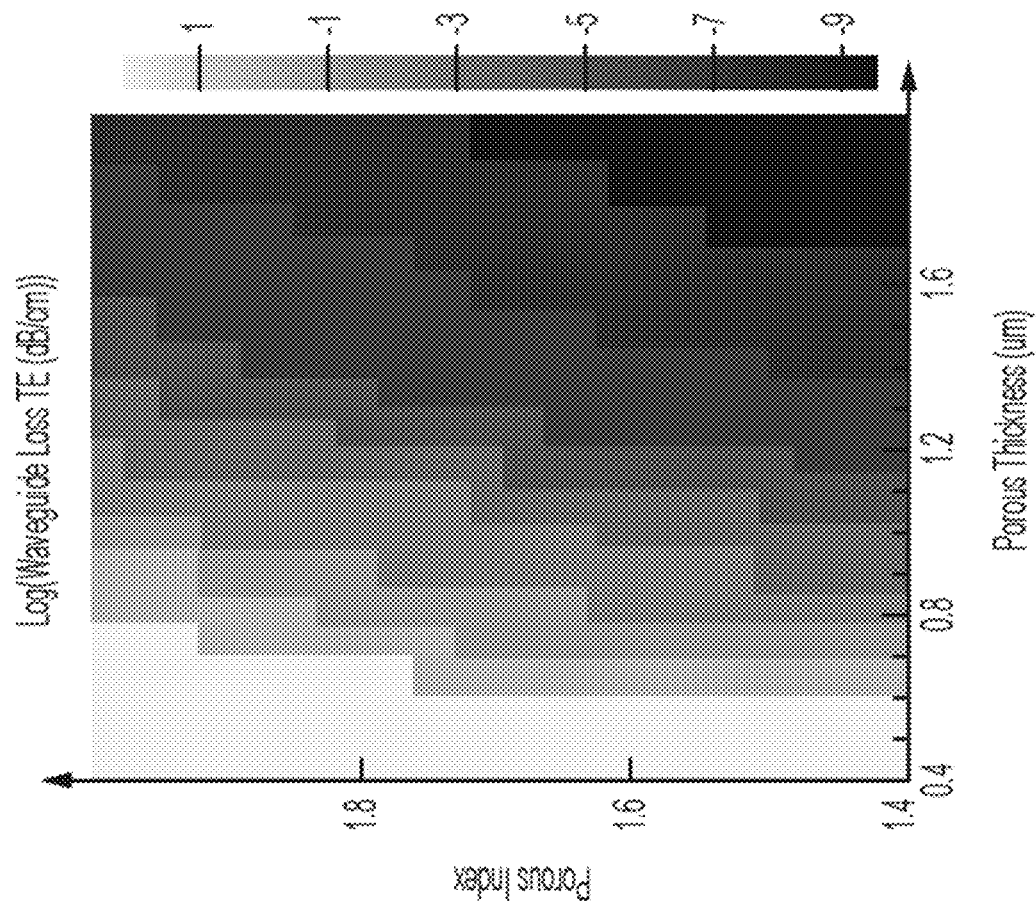
FIG. 7D is a contour plot of loss as a function of index of refraction and thickness, according to an embodiment of the present disclosure.
Figure 7E:
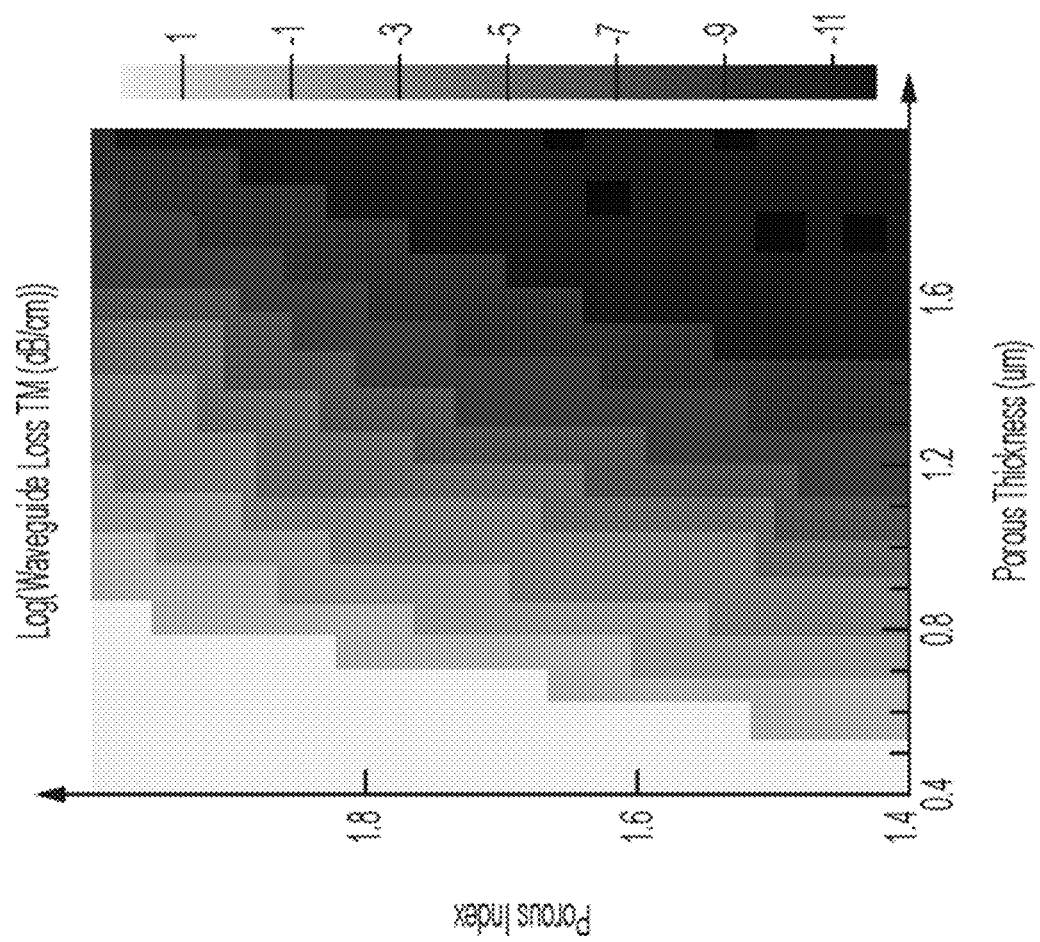
FIG. 7E is a contour plot of loss as a function of index of refraction and thickness, according to an embodiment of the present disclosure.
Figure 7F:
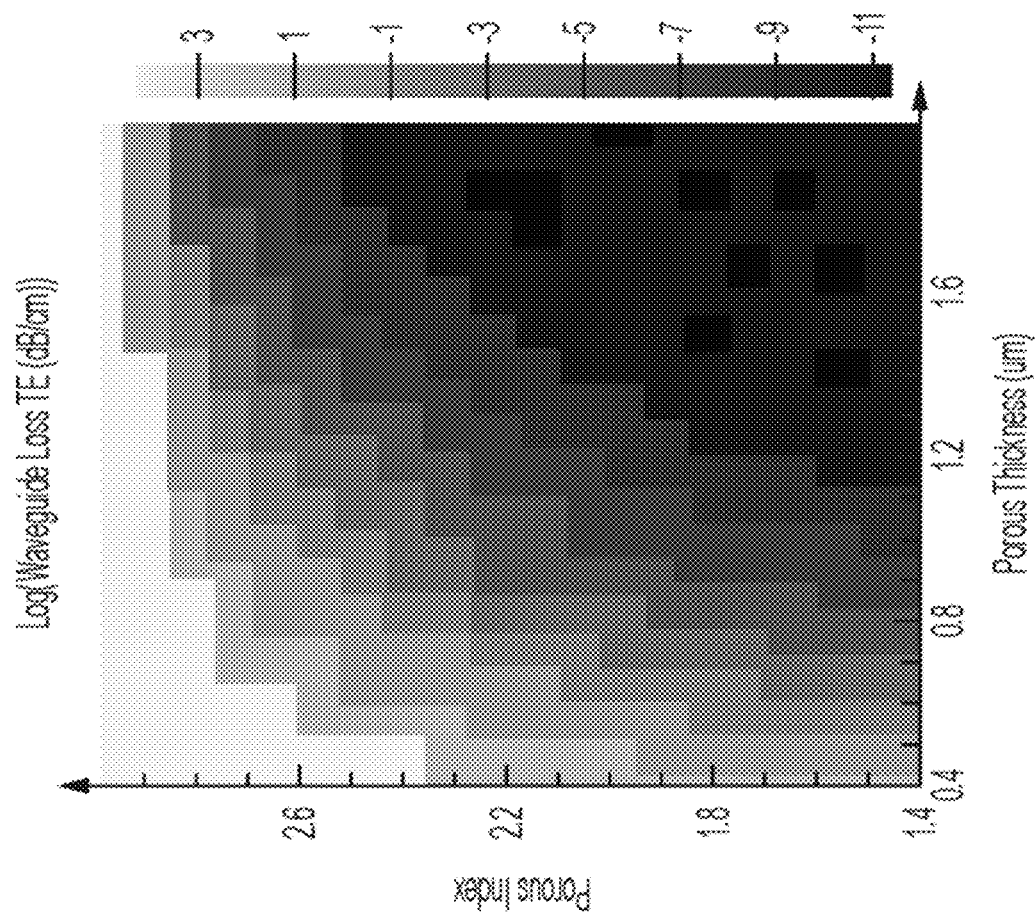
FIG. 7F is a contour plot of loss as a function of index of refraction and thickness, according to an embodiment of the present disclosure.
Figure 7G:
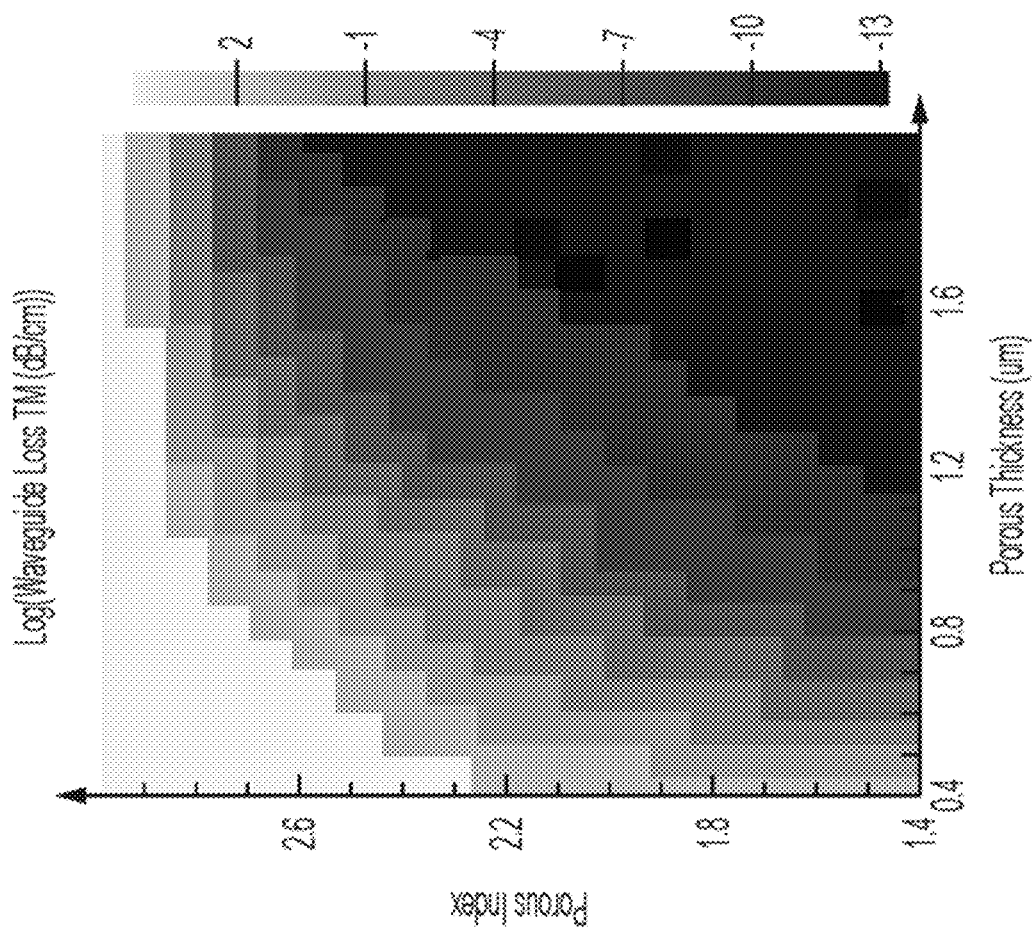
FIG. 7G is a contour plot of loss as a function of index of refraction and thickness, according to an embodiment of the present disclosure.

A waveguide may then be formed by etching a suitable profile into the first layer 720 of porous silicon (and, optionally, e.g., in the case of a strip waveguide, into the second layer 725 of porous silicon). Part of the silicon wafer 715 may be masked off during the electrochemical etching processes so that other structures formed from nonporous silicon, such as nonporous silicon waveguides, may be fabricated on the same chip. FIG. 7C shows a cross-section of a waveguide model used to simulate the behavior of a porous strip waveguide formed on a layer of higher-porosity silicon, as (discussed above in the context of FIGS. 7A and 7B). FIGS. 7D-7G show the logarithm (to the base 10) of the loss of the porous waveguide per cm of length, expressed in decibels (dB) (i.e., each value shown in the legend of each of FIGS. 7D-7G is Log(10 Log(L)), where L is the loss per cm (L=(input power)/(output power)/(length in cm)), and each Log function is to the base 10), as a function of the index of refraction of the layer 710 of higher-porosity silicon and of the thickness of the layer 710 of higher-porosity silicon.

In some embodiments a porous silicon sensor is formed on a silicon photonics chip, or "photonic integrated circuit", together with other elements, such as laser sources, photodetectors, power splitters, combiners, wavelength filters, Bragg gratings, and ring resonators. As used herein, a "wavelength filter" is any optical device having an input and an output, the transmissivity of which depends on the wavelength of light fed to the input (and which may also depend on other factors, such as, in the case of a chemical-sensitive wavelength filter, the presence or absence of chemicals of interest in the wavelength filter). In some embodiments, porous waveguides are made out of a material other than porous silicon, e.g., porous silicon carbide. As used herein, a "portion" of a structure means all or less than all of the structure. For example, a waveguide having a porous portion means a waveguide that is entirely porous, or a waveguide part of which is porous, and part of which is nonporous. As used herein, a "waveguide" is a structure, with an index of refraction greater than 1, that supports the propagation of confined optical modes. The "waveguide" does not include any adjacent structures with lower indices of refraction within which only evanescent waves exist. As such, in the case of a rib or strip waveguide made of silicon on a layer of silicon dioxide, the "waveguide" does not include the silicon dioxide. In the case of a rib waveguide, the "waveguide" includes a symmetrical portion of the slab such that 95% of the propagating optical power is within the waveguide. It will be understood that when an element or layer is referred to as being "on" another element or layer, it may be directly on the other element or layer, or one or more intervening elements or layers may be present. In contrast, when an element or layer is referred to as being "directly on" another element or layer, there are no intervening elements or layers present.

Although exemplary embodiments of a porous silicon sensor have been specifically described and illustrated herein, many modifications and variations will be apparent to those skilled in the art. Accordingly, it is to be understood that a porous silicon sensor constructed according to principles of this invention may be embodied other than as specifically described herein. The invention is also defined in the following claims, and equivalents thereof

What is claimed is:

1. A method for fabricating a waveguide having a porous portion, the method comprising:
   fabricating a starting wafer, the starting wafer comprising a substrate and a top surface composed at least in part of porous silicon, and
   etching the top surface of the starting wafer to form the waveguide,
   wherein the fabricating of the starting wafer comprises:
   fabricating a first wafer, the first wafer comprising:
       a silicon substrate, and
       a layer of silicon dioxide on the silicon substrate;
   fabricating a second wafer, the second wafer comprising:
       a silicon substrate,
       a high-porosity porous silicon layer on the silicon substrate, and
       a low-porosity porous silicon layer on the high-porosity porous silicon layer, the low-porosity porous silicon layer having lower porosity than the high-porosity porous silicon layer;
   bonding together the first wafer and the second wafer to form a bonded assembly; and
   cleaving the bonded assembly at the low-porosity porous silicon layer to form a bonded wafer, the bonded wafer having a top surface of porous silicon.

2. The method of claim 1, wherein the fabricating of the second wafer comprises:
   etching, in a first process, a top surface of a silicon wafer, to form a first porous silicon layer,
   etching, in a second process, the top surface of the silicon wafer, to form a second porous silicon layer below the first porous silicon layer, the second porous silicon layer having a higher porosity than the first porous silicon layer.

3. The method of claim 2, wherein the first process comprises performing an electrochemical etch at a first current density, and the second process comprises performing an electrochemical etch at a second current density.

4. The method of claim 3, wherein the second current density is greater than the first current density.

5. The method of claim 1, wherein the top surface of the starting wafer is further composed in part of nonporous silicon.

6. The method of claim 5, wherein the method further comprises, before etching the starting wafer to form the waveguide:

etching, over a portion of the bonded wafer, the top surface of the bonded wafer; and growing nonporous silicon on the portion of the bonded wafer.

7. The method of claim 5, wherein the waveguide has a porous portion and a nonporous portion.

8. The method of claim 1, wherein:

the second wafer further comprises a layer of nonporous silicon on the low-porosity porous silicon layer, and the bonded wafer further comprises the layer of nonporous silicon below the top surface of porous silicon.

* * * * *